(12) United States Patent
Skarica et al.

(10) Patent No.: US 7,171,121 B1
(45) Date of Patent: Jan. 30, 2007

(54) OPTICAL NETWORK SUBSCRIBER ACCESS ARCHITECTURE

(75) Inventors: Christopher M. Skarica, Arnprior (CA); Barry C. E. Pratt, Neapean (CA); Oscar Danieli, Grimsby (CA); Norman G. Provan, Kanata (CA)

(73) Assignee: Nortel Networks Limited, St. Laurent ( * ) Notice: Subject to any disclaimer, the term of this patent is extended or adjusted under 35 U.S.C. 154(b) by 899 days.

(21) Appl. No.: 09/928,745

(22) Filed: Aug. 14, 2001

Related U.S. Application Data

(60) Provisional application No. 60/247,054, filed on Nov. 13, 2000.

(51) Int. Cl.
*H04J 14/00* (2006.01)

(52) U.S. Cl. .............. 398/67; 398/70; 398/71; 398/72

(58) Field of Classification Search .......... 398/66, 398/67, 68, 69, 70, 71, 72
See application file for complete search history.

(56) References Cited

U.S. PATENT DOCUMENTS

| | | | | |
|---|---|---|---|---|
| 5,349,547 A | * | 9/1994 | Harrand | 708/308 |
| 5,724,468 A | * | 3/1998 | Leone et al. | 385/134 |
| 5,778,116 A | * | 7/1998 | Tomich | 385/16 |
| 5,784,516 A | * | 7/1998 | Parzygnat et al. | 385/134 |
| 5,936,753 A | * | 8/1999 | Ishikawa | 398/72 |
| 6,362,908 B1 | * | 3/2002 | Kimbrough et al. | 398/164 |

FOREIGN PATENT DOCUMENTS

JP          09133607 A  *  5/1997

* cited by examiner

*Primary Examiner*—Dalzid Singh
(74) *Attorney, Agent, or Firm*—Hunton & Williams

(57) ABSTRACT

A technique for providing an optical signal to a destination. In one embodiment, the technique is realized through the use of an environmentally hardened, modular switch and a fiber distribution methodology. The modular switch may include fiber access ports, power access ports, dual power supply modules, dual switch fabric modules, dual optical trunking modules, and multiple subscriber service modules that house subscriber service ports and serve a total of up to 96 end points. The dual optical trunking modules may act as an interface between an optical network and the dual switch fabrics, and provide redundancy and variable optical transmission distance between the modular switch and the optical network to which the modular switch is connected. The dual switch fabrics are used for switching and aggregating signals and providing redundancy. Each subscriber service module acts as an interface between one or more subscriber end points and the dual switch fabrics of the modular switch. The subscriber service modules may be coupled to one or both of the dual switch fabrics and a total of up to 96 subscriber end points. Subscriber end point connectivity may be achieved via subscriber service ports (housed within a subscriber service module), one or more of the fiber access ports, external fiber optic splice cabinet, fiber optic trunk cable, and one or more fiber breakout points (housed by pedestals). The subscriber end points may consist of one or more optical or electrical subscriber connection types.

36 Claims, 4 Drawing Sheets

OPTICAL NETWORK SUBSCRIBER ACCESS ARCHITECTURE

CROSS-REFERENCE TO RELATED APPLICATIONS

This patent application is related to the subject matter of copending U.S. Patent Application No. 60/247,054, filed Nov. 13, 2000, which is hereby incorporated by reference herein in its entirety.

FIELD OF THE INVENTION

The present invention relates generally to an optical access network architecture and, more particularly, to a technique for using optical fibers to provide multi-service network access to homes, businesses, and or multi-dwelling units.

BACKGROUND OF THE INVENTION

As the demand for Internet use grows, the need for high speed internet access is also growing. Deregulation has allowed different service providers to compete for voice, video and data subscribers. Cable TV companies have installed fiber optics and upgraded their networks to become a leader in the area of high speed Internet access service.

Phone companies are deploying DSL technology to enable higher bandwidth Internet connectivity over traditional phone lines while stopping the tying up of phone circuits. The phone companies have achieved reasonable penetration and higher bandwidth than cable modems, although the technology is distance limited resulting in limited subscriber coverage. In addition, access to DSL is also limited by twisted pair copper line integrity. Thus, DSL is not available to many phone company subscribers. A new technology being developed allows voice to be carried via cable modems (voice over internet protocol or "VoIP"). Thus, many cable companies are beginning to offer bundled service packages of voice, video, and ultra high speed data services.

Bundled service offerings have become a goal of multiple service providers. However, cable modem technology utilizes a shared medium, and, thus, has security and bandwidth limitations. High penetration rates result in reduced data speeds at peak usage times, and thus cable modem technology cannot support high bandwidth to all users simultaneously.

Direct broadcast satellite ("DBS") companies and wireless companies are also offering Internet access services using telephone connections to achieve bi-directional traffic flow.

The telephone companies' installed access network technology reaches homes and other end points with twisted pair copper wires. Due to the limitations of copper cable media, the current telephone access network technology is reaching its physical bandwidth limit.

Therefore, although a number of high bandwidth networks are available for data, voice and video, the access technology at the edge of traditional networks tends to cause bottlenecks. Access to homes may be through twisted copper pair wiring, which may have a capacity of one millionth of the capacity of the portion of the network to which it is connected. For example, a "long haul" portion of the network may have a capacity of terabits per second and a "metro" portion of the network may have a capacity of hundreds of gigabits per second, while the "access" part of the network, connected to the metro portion, may have a capacity of only hundreds of kilobits per second per user. For "this" example, an access technology having a bandwidth of 10–100 Mbps per user may be required when all users are "online" at the same time.

In view of the foregoing, it would be desirable to provide a technique for providing a standards based access network technology solution which overcomes the above-described inadequacies and shortcomings. More particularly, it would be desirable to provide a technique for providing secure, high bandwidth, standards based access network technology in an efficient and cost effective manner.

SUMMARY OF THE INVENTION

A technique for providing an optical signal to a destination is disclosed. In one embodiment, the technique is realized through the use of a modular switch and a fiber distribution methodology. The modular switch may include fiber access ports, power access ports, dual power supply modules, dual switch fabric modules, dual optical trunking modules, and multiple subscriber service modules. The subscriber service modules may house subscriber service ports and serve a total of up to 96 end points. In one embodiment, the modular switch may include an environmentally hardened modular switch.

The dual power supply modules may include a first power supply module and a second power supply module. These may be used in either a load sharing or primary/backup configuration. These modules are used to provide the required power for the dual optical trunking modules, dual switch fabric modules, and subscriber service modules of the modular switch. The dual power supply modules may connect to an external AC power source, via the power access ports, and provide the required AC and DC power for all internal active electronics of the modular switch.

The dual optical trunking modules may include a first trunking module and a second trunking module. The dual optical trunking modules act as an interface between an optical network and the dual switch fabrics. These modules provide redundancy and variable optical transmission distance between the modular switch and the optical network it is connected to. The dual optical trunking modules may be coupled with fiber optic cable to receive/transmit signals to/from a fiber access port. The dual optical trunking modules may also be coupled to receive/transmit signals to/from the dual switch fabrics.

The dual switch fabrics may include a first switch fabric module and a second switch fabric module. Each switch fabric module may be coupled to one or both of the dual optical trunking modules and all of the subscriber service modules. The switch fabric modules are used for switching and aggregating signals and providing redundancy.

The modular switch may include one or more subscriber service modules. Each subscriber service module acts as an interface between one or more subscriber end points and the dual switch fabrics of the modular switch. The subscriber service modules may be coupled to one or both of the dual switch fabrics and a total of up to 96 subscriber end points. Subscriber end point connectivity may be achieved via one or more of the fiber access ports. The subscriber end points may consist of one or more optical or electrical subscriber connection types.

In accordance with other aspects of the present invention, a network including the modular switch is described. The network may include a network transmitting a signal, a router coupled to the network to route the signal, a modular switch coupled to the router, the modular switch receiving a signal from the router and switching the signal to provide point to point destination access, a fiber access box at a destination coupled to the modular switch, and a destination device receiving a signal from the network. In one embodiment, the modular switch includes dual optical trunking modules coupled to dual switch fabric modules wherein the switch fabric modules are coupled to one or both of the dual optical trunking modules.

In accordance with further aspects of the present invention, a method of providing a signal to a destination is described. The method includes the modular switch receiving a signal in one or both of the dual optical trunking modules, coupling the signal to one or both of the dual switch fabric modules, switching the signal in one or both of the dual switch fabric modules, coupling the switched signal to one or multiple subscriber service modules, transmitting the switched signal from the subscriber service module to a network access box at a destination.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art, having access to the teachings herein, will recognize additional implementations, modifications, and embodiments, as well as other fields of use, which are within the scope of the present invention as disclosed and claimed herein, and with respect to which the present invention, could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
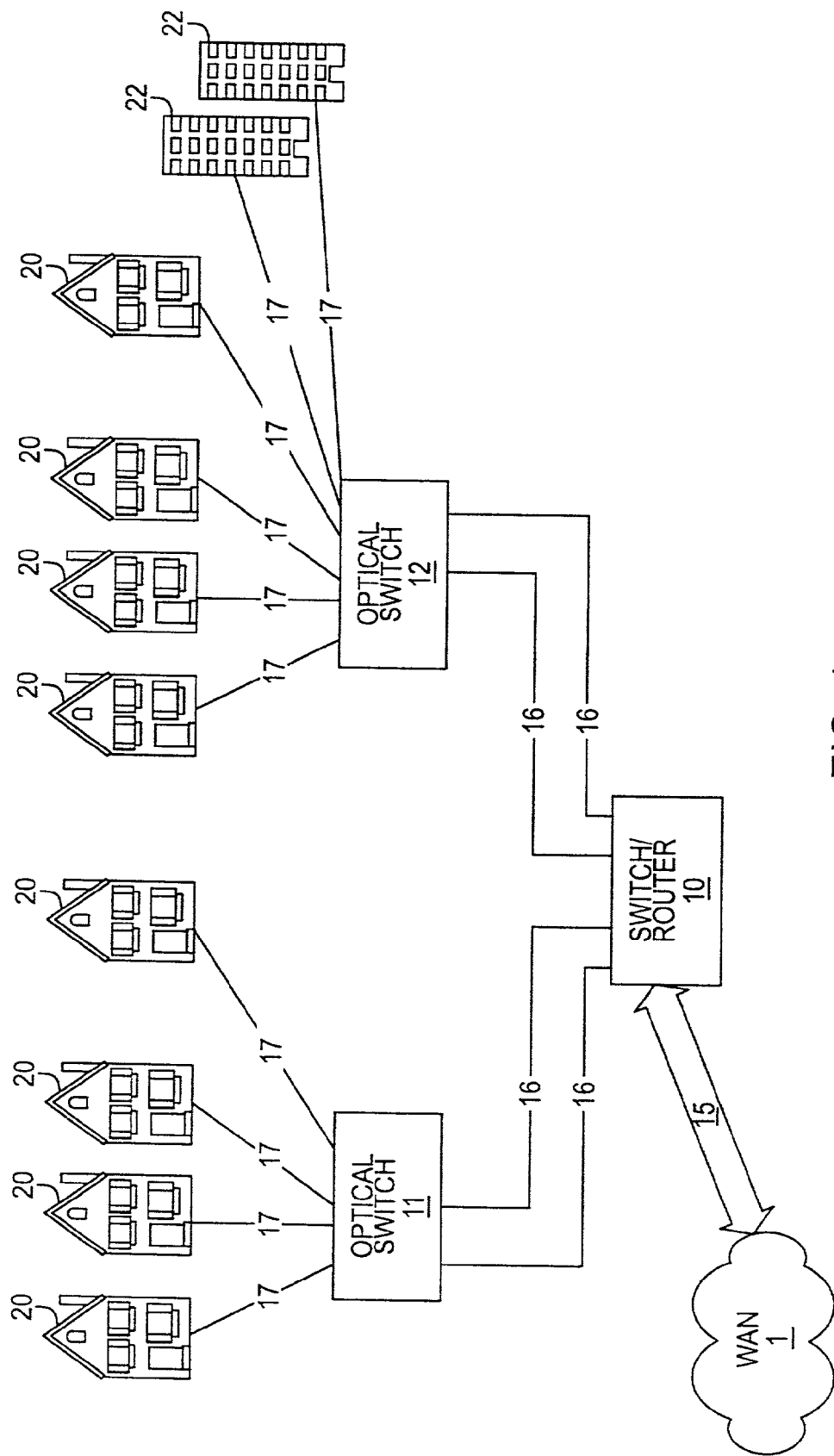
FIG. 1 is a block diagram illustrating one embodiment of an optical network according to one embodiment of this invention.

Referring to FIG. 1, there is shown a block diagram illustrating one embodiment of an optical network according to one embodiment of this invention. Optical network 100 may include a network 1, a switch router 10, modular switches 11, 12, houses 20 and buildings 22.

In one embodiment, network 1 may include a wide area network or any other appropriate network. Network 1 may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Network 1 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Network 1 may yet further be, include or interface to any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection.

Network 1 may be coupled to switch/router 10 through connection 15. Connection 15 may include any type of appropriate connection. In one embodiment, connection 15 between network 1 and switch/router 10 may include an Ethernet-based fiber optic connection 15. In one embodiment, network 1 may communicate with switch router 10 using the internet protocol ("IP"). IP effectively supports the transport of voice, digital video and internet data. In one embodiment, IP may be used as the layer 3 transmission technology.

In one embodiment, the layer 2 transmission technology may utilize the Ethernet. Ethernet is an industry standard transport technology. Ethernet is widely used in local area networks ("LAN"). Ethernet also eliminates need for modems, it is the least complex to manage and easy to install. Ethernet supports quality of service ("QoS") protocols such as IEEE 802.1p, Multi-protocol label switching ("MPLS"), and DiffServ. Ethernet is available in 10 Mbps, 100 Mbps, 1 Gbps, and 10 Gbps speeds. Both optical and electrical cabling are supported by Ethernet. Ethernet allows the lowest cost per port of available technologies. In other embodiments, layer 2 transmission technologies may include SONET, Packet over Sonet (POS), ATM, XDSL, or analog RF. Connections 16 may include IP over gigabit Ethernet ("GbE") or 10 gigabit Ethernet, over fiber with link aggregation capability (also known as multi-link trunking "MLT"). Switch/router 10 may include a L2/L3 switch/router. Signals received from network 1 may be switched or routed to modular switches 11, 12 by switch/router 10. Optical switches 11, 12 may include environmentally hardened, outdoor active Ethernet switches supporting up to 96 100 Mbps connections each Modular switches 11, 12 may switch or route signals received from switch/router 10 to one of houses 20 or buildings 22 or other destinations. Modular switches 11, 12 may be connected to users 20, 22 through connection 17.

Connection 17 may include point-to-point single mode/single fiber 100 Mbps connections. In another embodiment, connection 17 may include single or dual fiber GbE connections. Since the connections 17 are point-to-point, each destination 20, 22 would have its access to data directed to that destination only.

Network 100 utilizes Ethernet-based active components at the edge of network 100, as opposed to traditional passive optical network ("PON") approaches. Thus, network 100 gains advantages that the active Ethernet network elements offer. For example, network 100 provides point-to-point secure Ethernet-based connections at each user's site 20, 22.

As will be described below with reference to FIG. 2, network 100 provides scalability and modular growth so that the investment required is proportional to growth. Network 100 also provides subscriber interface flexibility. For example, service modules for subscribers 20, 22 may be added as user penetration increases. Also, subscribers may use a 100 Mbps interface or a 1 Gbps interface.

Network 100 accommodates up to 48:1 "line to trunk" fiber reduction at the edge of the Network. This could be accomplished in one embodiment where a modular switch is equipped with a single trunking module and multiple subscriber service modules serving a total of 96 single fiber subscriber destination points. The trunking module may utilize two fibers to connect to the service provider network. Multiple subscriber service modules may connect to up to 96 destination points with single fiber connections. This would result in a (96 fibers line)÷(2 fibers trunk)=48 times fiber reduction at the modular switch (i.e., network edge). The actual fiber reduction at the modular switch will be dictated by the number and type of optical trunking modules as well as the number and type of subscriber service modules. Ultimately, Network 100 enables flexible line-to-trunk ratios and supports multiple access network configurations.

Figure 2:
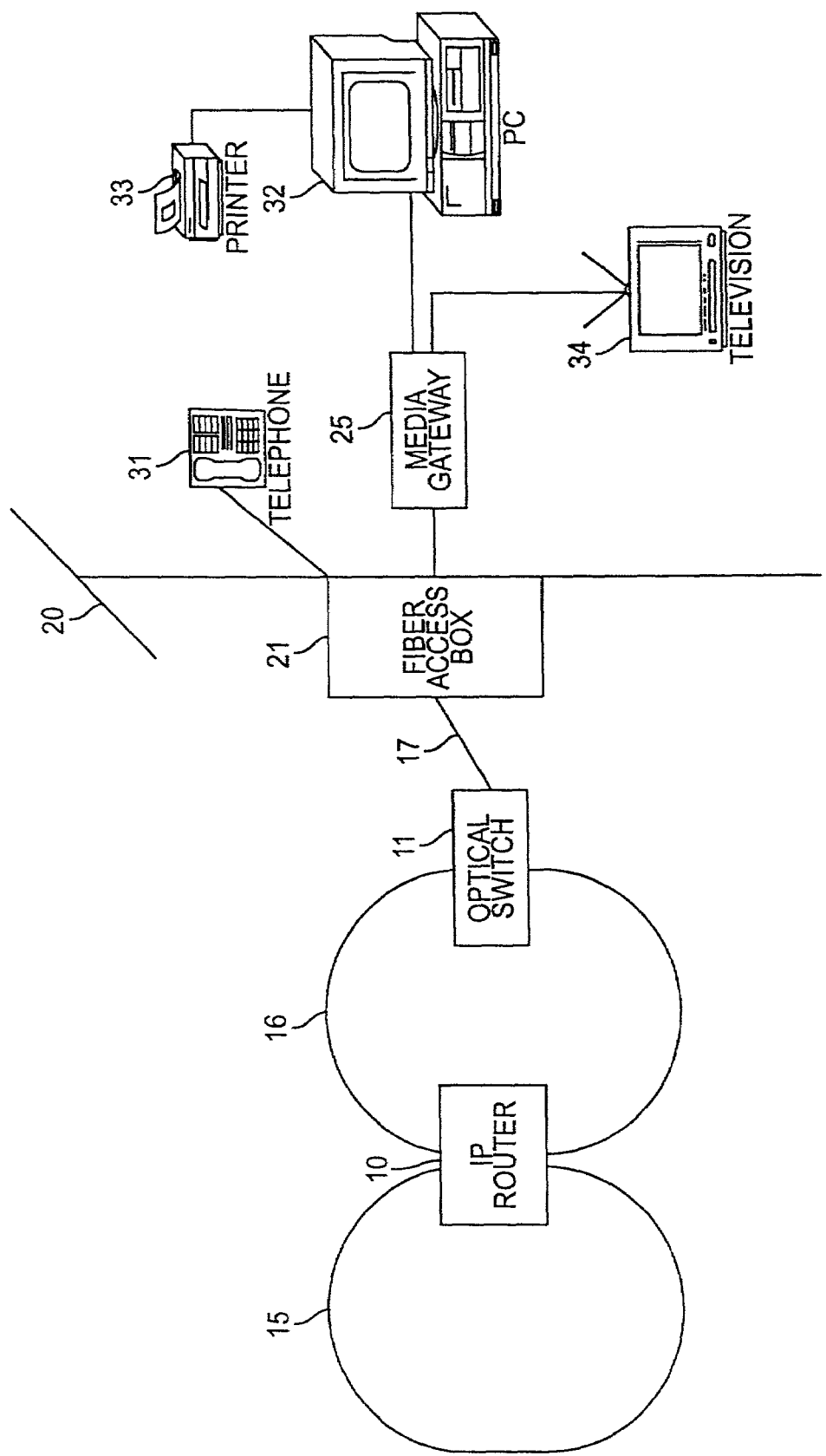
FIG. 2 is a block diagram illustrating fiber access to a home according to one embodiment of the optical network home access network architecture.

FIG. 2 is a block diagram illustrating one embodiment of an optical network home access architecture. The optical network home access architecture includes IP router 10, modular switch 11, and destination or user site 20.

In one embodiment shown, connections 15 and 16 may include ring architectures. In one embodiment, modular switch 11 may be coupled to user site 20 through connection 17 and fiber access box 21. In one embodiment, fiber access box 21 may be coupled to a media gateway 25, contain a voice over IP gateway, and be coupled to user device 31 (i.e. telephone).

In one embodiment, media gateway 25 is located within the destination 20. For example, the media gateway 25 may be inside a subscriber's house. In one embodiment, media gateway 25 may direct signals from fiber access box 21 to user devices 32–34. In one embodiment, media gateway 25 may direct signals from user devices 32–34 to fiber access box 21. User devices may include computer 32, television 34, etc. The user devices may further be connected to other devices. For example, computer 32 may be coupled to printer 33. In one embodiment, telephone 31 may be connected to the media gateway 25 instead of the fiber access box 21.

In one embodiment, modular switch 11 provides reach of up to 70 km with network route and equipment failure protection. This is accomplished via ring connection 16, dual optical trunking modules, dual switch fabric modules, and link aggregation protocols, such as, for example, Multi gigabit ethernet trunking with link aggregation, such as Multi-Link Trunking ("MLT") or Equal Cost Multi Path ("ECMP")/Open Shortest Path First ("OSPF"), and physically different network routes for each gigabit trunk connection. In addition, modular switch 11 provides a bandwidth engineering point with flexible subscriber service module, switch fabric module, and trunk module configurations.

Modular switch 11 may also allow a variable number of subscriber service modules to be used in the switch 11. Thus, switch 11 would be a modular "pay as you grow" switch, with the number of subscriber service modules dictated by subscriber penetration. This modular switch 11 may be an intelligent bandwidth point allowing the service provider to dictate the trunk and subscriber bandwidth based on the module configuration of switch 11. The switch 11 may also allow interface flexibility, as discussed above, by using inexpensive, single fiber, 100 Mbps Ethernet optical subscriber connections (connection 17) or more expensive single or dual fiber GbE optical subscriber connections (connection 17). Therefore, connection 17 may be secure point-to-point fibers having a 20 to 30 km reach. Additionally, network 100 supports both ring and point-to-point architectures.

Figure 3:
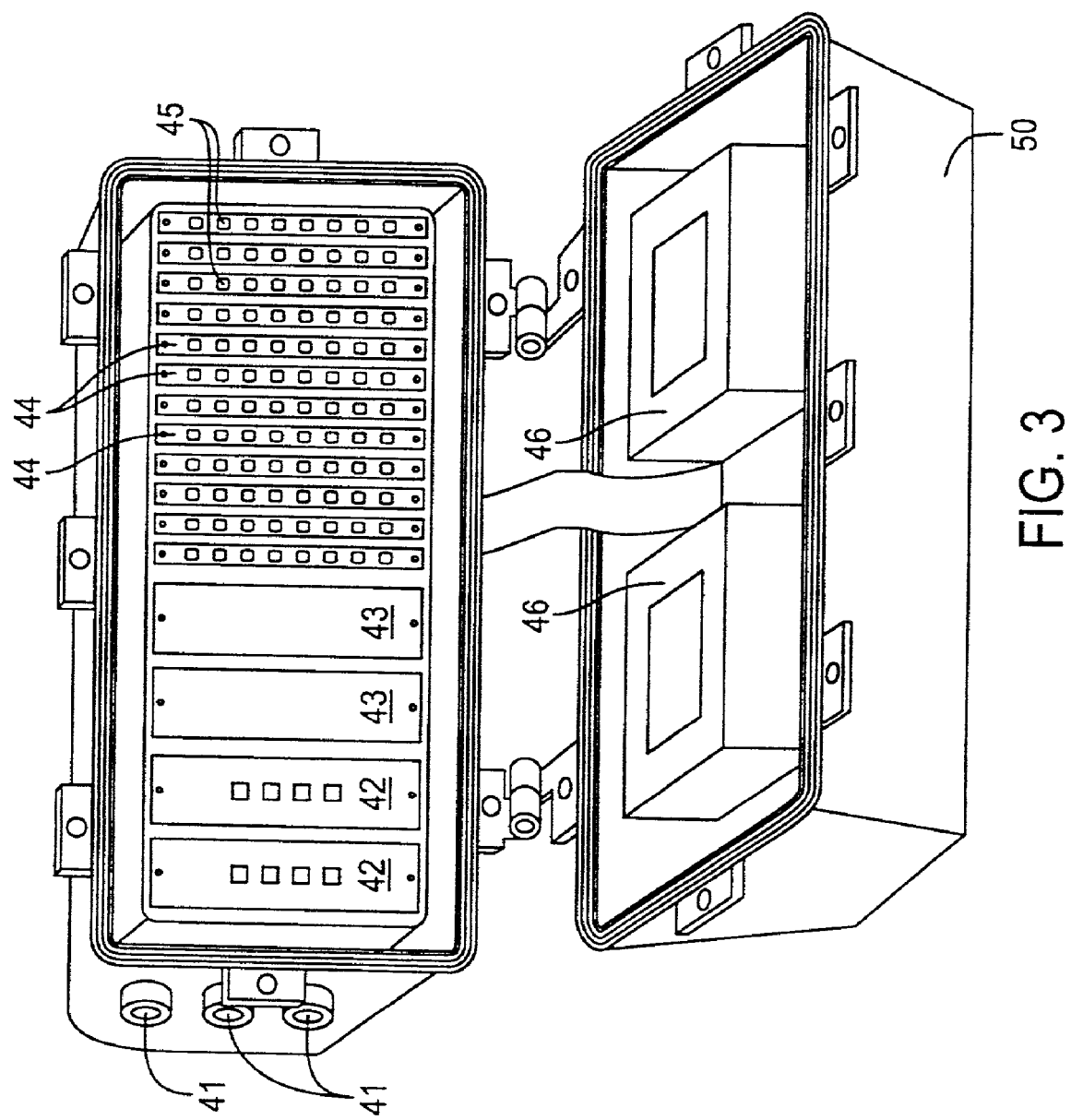
FIG. 3 is a representational diagram illustrating one embodiment of a modular switch.

FIG. 3 is a representational diagram illustrating one embodiment of modular switch 11. In one embodiment, modular switch 11 may be a high density, optical Ethernet switch in an environmentally hardened outdoor housing 50. Switch 11 may include access ports 41, subscriber service module slots 44, subscriber service routing connections 45, dual optical trunking modules 42, dual switch fabric modules 43, and dual power supplies 46. Access ports 41 may include fiber entry access ports and power access ports. In one embodiment, the modular switch 11 may include six (6) access ports where four (4) access ports are for fiber entry and two (2) access ports are for 60/90VAC power.

Switch 11 may include dual trunk modules 42 for providing redundant optical connectivity to the service provider network at various distances up to 70 km (possibly higher in the future). In one embodiment, the dual trunking devices may each include one or more Gigabit Interface Converter ("GBIC") trunk optic cards supporting link aggregation (ex. Ethernet Multi-Link Trunking). In another embodiment, the dual optical trunking modules 42 each include 10 Gbps trunk optic cards.

The switch may further include dual switch fabric modules 43. The switch fabric modules 43 each may include 32 Gbps or higher capacity switch fabrics. In one embodiment, the dual optical trunking modules may include a first trunking module and a second trunking module with each optically coupled to the service provider network. The switch fabric modules may support Ethernet switching, Internet Protocol routing, Multiprotocol Label Switching, and/or IEEE802.17 Resilient Packet Ring.

The dual switch fabrics may include a first switch fabric module and a second switch fabric module coupled to one or both of the dual optical trunking modules and all of the subscriber service modules.

Thus, in one embodiment, the dual optical trunking modules may receive/transmit signals to/from the service provider network through an access port 41. The dual trunk modules may also be coupled to the dual switch fabric modules contained in switch 11. Signals are directed to, switched, and aggregated by one or both of the dual switch fabric modules. The signals may then be directed, within switch 11, from the dual switch fabric modules to at least one subscriber service port 45 residing on a subscriber service module.

The subscriber service port 45 may provide access to a subscriber 20, 22. In one embodiment, the subscriber service port feeds an optical subscriber service cable that can be spliced to a fiber optic trunk cable within an external fiber optic splice cabinet. In one embodiment, the modular switch 11 may include up to 12 optical subscriber service module slots. Each slot may be populated with different subscriber service modules. The switch 11 may service up to 96 user sites, 20, 22. Subscriber service modules may be inserted into switch 11 as required. Several different subscriber service modules and optical trunking modules may be used in switch 11. In one embodiment, one or more multi-port 100

Mbps Single Fiber ("lOOBSFX") subscriber service modules may be used in the switch 11. The lOOBSFX subscriber service modules use single mode, single fiber, hardened transceivers.

In one embodiment, the switch 11 may include 16 module slots. Two module slots may be used for the dual switch fabrics 43, two module slots may be used for the dual optical trunking modules 42 and 12 slots may be used for the subscriber service modules.

The power supply may be a dual 60/90VAC power supply. The power supply 46 may provide redundancy capability. The housing 50 may be environmentally hardened. In one embodiment, switch 11 includes environmentally hardened optical components and chip sets. Thus, the optical components and chip sets would have a safe operating temperature range of −40° C. to 85° C. instead of 0° C. to 40 or 45° C.

In one embodiment, multiple switches 11 may be coupled to a 20,000 homes passed network with four (4) rings of 96 fibers. In another embodiment, multiple switches 11 may be coupled to a 20,000 homes passed network with 8 rings of 48 fibers. In another embodiment, multiple switches 11 may be coupled to a 20,000 homes passed network with 16 rings of 24 fibers. In another embodiment, multiple switches 11 may be coupled to a network with 32 rings of 12 fibers.

Thus, because of the dual optical trunking modules and the dual switch fabric modules, protection against fiber cuts and equipment failure is provided down to the 96 or lower home level. The increased safe temperature range of switch 11 and its components provides further protection capability against equipment failures. In one embodiment, the first trunking module may communicate in one physical direction while the second trunking module card portion may communicate in a different physical direction. For example, the first trunking module may communicate with the service provider network in an eastern direction while the second trunking module may communicate with the service provider network in a western direction. Thus, signals processed through each trunking module are forced in different directions over different routes, providing protection against fiber cuts and equipment failure in the other of the two routes.

Figure 4:
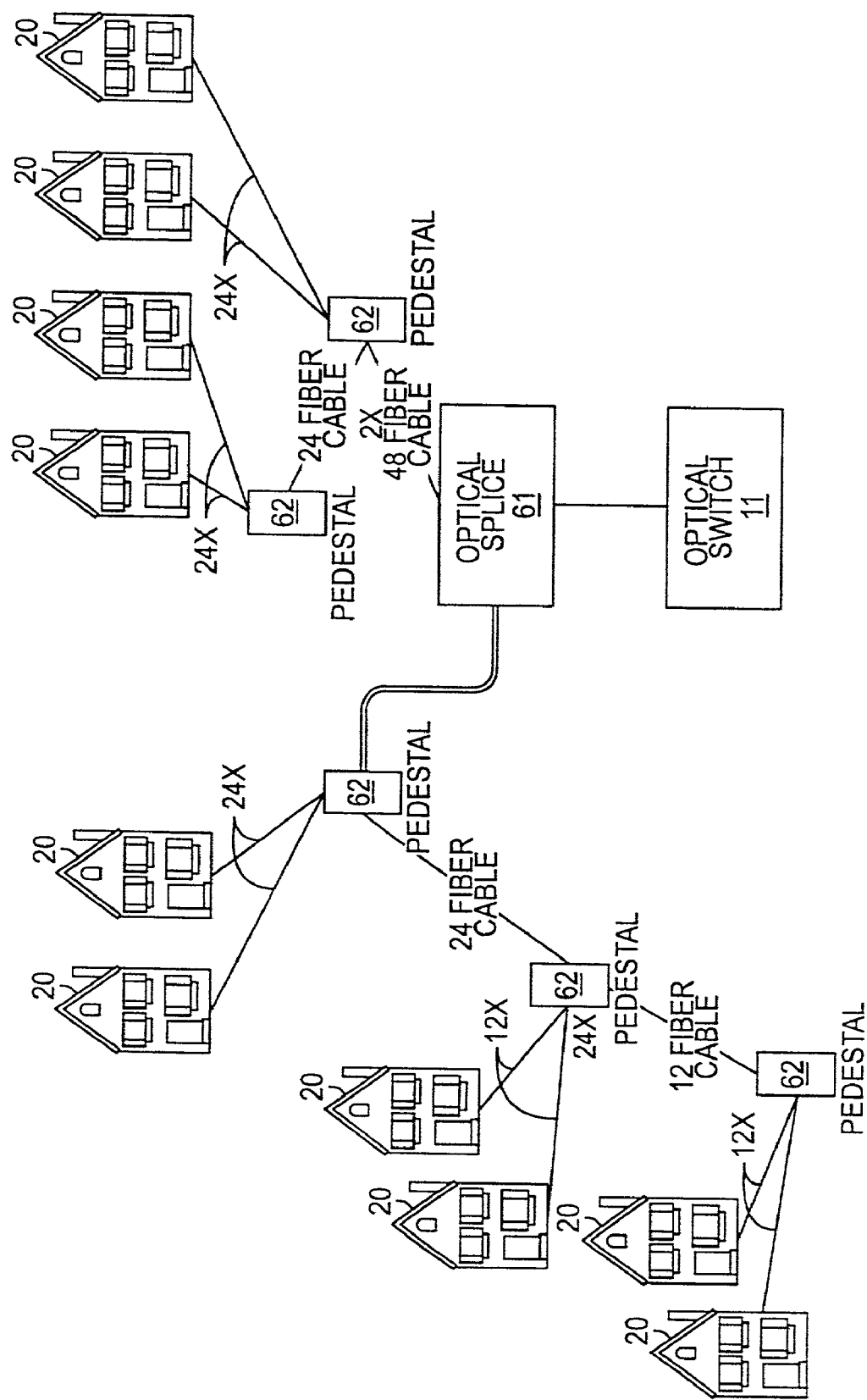
FIG. 4 is a block diagram illustrating another embodiment of an optical network home access architecture.

FIG. 4 is a block diagram illustrating another embodiment of the optical network home access architecture. The optical network of FIG. 4 includes a splice cabinet 61 coupled between switch 11 and user site 20. The splice cabinet may be utilized to provide an interconnection point between fiber optic service pigtails, that connect to the subscriber service modules of switch 11, and optical trunking cables used to enable fiber connectivity for network end points. The splice cabinet 61 may accommodate up to 8 twelve fiber splice trays and up to 96 optical splices. The optical trunking cables used to create fiber connectivity for network end points may be of various quantities (1, 2, 3, 4, 5, 6, 7, 8) and sizes (12 fiber, 24 fiber, 48 fiber, 72 fiber, 96 fiber).

In one embodiment, the optical network includes one or more pedestals coupled between switch 11 and user sites 20. Pedestal 62 may be used as a breakout point for several fibers from the optical trunking cables. The total number of fibers that breakout at each pedestal will be dictated by the service provider network configuration. For example, as displayed in FIG. 4, the pedestals house fiber breakout quantities of 12 and/or 24 fibers although this number is variable.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

What is claimed is:

1. A modular switch comprising:
dual optical trunking modules coupled to transmit optical signals to and receive optical signals from a service provider, the dual optical trunking modules including a first optical trunking module and a second optical trunking module;
dual optical switch fabric modules coupled to transmit optical signals to and receive optical signals from the dual optical trunking modules, the dual optical switch fabric modules including a first optical switch fabric module and a second optical switch fabric module; and
a plurality of subscriber service modules coupled to transmit optical signals to and receive optical signals from the dual optical switch fabric modules and a plurality of subscribers, each of the plurality of subscriber service modules for providing subscriber services to respective ones of the plurality of subscribers;
wherein the dual optical trunking modules and the dual optical switch fabric modules provide redundancy by routing optical signals through the first optical trunking module to both the first optical switch fabric module and the second optical switch fabric module and routing signals through the second optical trunking module to both the first optical switch fabric module and the second optical switch fabric module;
wherein the first optical trunking module transmits and receives optical signals to and from the service provider in a first physical direction along an optical ring network and the second optical trunking module transmits and receives optical signals to and from the service provider in a second physical direction, opposite the first physical direction, along the optical ring network.

2. The modular switch of claim 1 rein the dual optical trunking modules each comprise one or more 1 gigabit Ethernet trunk optic cards or one or more 10 gigabit Ethernet optics cards.

3. The modular switch of claim 1 wherein the dual optical switch fabric modules each comprise 32 Gbps or higher switch fabrics.

4. The modular switch of claim 1 wherein the dual optical switch fabric modules support at least one of ethernet switching, Internet Protocol routing, Multiprotocol Label Switching, and Resilient Packet Ring.

5. The modular switch of claim 1 further comprising an environmentally hardened outdoor housing.

6. The modular switch of claim 1 wherein the dual optical trunking modules, the dual optical switch fabric modules, and the plurality of subscriber service modules comprise environmentally hardened optical and electrical components.

7. The modular switch of claim 6 wherein the optical and electrical components have an operating temperature range of about −40 degrees Celsius to 60 degrees Celsius.

8. The modular switch of claim 1 wherein each of the plurality of subscriber service modules interfaces between one or more subscriber end points and the dual optical switch fabric modules and comprises at least one subscriber service port.

9. The modular switch of claim 8 further comprising a plurality of subscriber service module slots, with each subscriber service module slot receiving a different one of the plurality of subscriber service modules.

10. The modular switch of claim 8 wherein the subscriber service modules collectively provide access to ninety-six homes.

11. The modular switch of claim 1 wherein each of the plurality of subscriber service modules is coupled to one or both of the dual optical trunking modules, via one or both of the dual optical switch fabric modules, providing network connectivity for subscriber service ports contained in the subscriber service module.

12. The modular switch of claim 11 wherein each of the plurality of subscriber service modules comprises multiple single mode, single fiber, environmentally hardened optical transceivers serving as subscriber service ports.

13. The modular switch of claim 1 wherein the first optical trunking module transmits and receives optical signals in the first physical direction and the second optical trunking module transmits and receives optical signals in the second physical direction using one or more optical fibers.

14. The modular switch of claim 13 wherein connections to the dual optical trunking modules comprise one of a layer 2 link aggregation and a layer 3 link aggregation to enable both route and equipment protection.

15. The modular switch of claim 13 further comprising fiber access ports used by the dual optical trunking modules to receive optical signals from and transmit optical signals to a ring network architecture.

16. The modular switch of claim 1 wherein connections to the plurality of subscribers comprise point to point connections.

17. The modular switch of claim 1 wherein the dual optical switch fabric modules are coupled to transmit optical signals to and receive optical signals from at least one of the dual optical trunking modules, the dual optical switch fabric modules further providing at least one of optical signal switching, routing, and traffic aggregation.

18. An optical network comprising:
a router coupled to route optical signals;
an environmentally hardened modular switch coupled to the router, the modular switch receiving optical signals from and transmitting optical signals to the router; and
at least one fiber access box at a destination coupled to the modular switch, each fiber access box receiving optical signals from and transmitting optical signals to the modular switch;
wherein the modular switch comprises:
dual optical switch fabric modules coupled to transmit optical signals to and receive optical signals from the dual optical trunking modules, the dual optical switch fabric modules including a first optical switch fabric module and a second optical switch fabric module; and
a plurality of subscriber service modules coupled to transmit optical signals to and receive optical signals from the dual optical switch fabric modules and the at least one fiber access box, each of the plurality of subscriber service modules for providing subscriber services to respective ones of a plurality of subscribers;
wherein the dual optical trunking modules and the dual optical switch fabric modules provide redundancy by routing optical signals through the first optical trunking module to both the first optical switch fabric module and the second optical switch fabric module and routing signals through the second optical trunking module to both the first optical switch fabric module and the second optical switch fabric module;
wherein the first optical trunking module transmits and receives optical signals to and from the service provider in a first physical direction along an optical ring network and the second optical trunking module transmits and receives optical signals to and from the service provider in a second physical direction, opposite the first physical direction, along the optical ring network.

19. The optical network of claim 18 wherein the modular switch performs at least one of fully redundant switching, aggregation, quality of service classification, and signal transport between the plurality of subscribers and the service provider.

20. The optical network of claim 18 wherein the network, the router, and the modular switch are coupled through ring architectures.

21. The optical network of claim 18 further comprising one or more pedestals coupled between the modular switch and the at least one fiber access box, the pedestal providing a fiber breakout point coupling the at least one fiber access box to the modular switch.

22. The optical network of claim 21 further comprising a fiber distribution device coupled to the modular switch wherein the pedestal provides a fiber breakout point coupling the at least one fiber access box to the modular switch through the fiber distribution device.

23. The optical network of claim 18 wherein the at least one fiber access box comprises an optical to electrical conversion unit.

24. The optical network of claim 18 wherein the at least one fiber access box comprises a voice over Internet protocol media gateway.

25. The optical network of claim 18 further comprising intelligent home networking equipment coupled to the at least one fiber access box, the home networking equipment located within a subscriber premise.

26. The optical network of claim 18 wherein the at least one fiber access box comprises a plurality of fiber access boxes.

27. The optical network of claim 18 further comprising an environmentally hardened fiber splice cabinet coupled between the modular switch and the at least one fiber access box, the fiber splice cabinet providing a fiber splice point between subscriber optical service cables and multiple fiber trunk cables used for connecting fiber access boxes to the modular switch, the subscriber optical service cables mating with subscriber service ports on the subscriber service modules.

28. The optical network of claim 27 wherein the environmentally hardened fiber splice cabinet includes multiple fiber access ports for one or more fiber trunk cables and one or more subscriber service cables.

29. The optical network of claim 27 wherein the fiber access ports of the environmentally hardened fiber splice cabinet comprise one or more fiber access ports accommodating one of one 96 fiber cable, two 48 fiber cables, four 24 fiber cables, eight 12 fiber cables, and one 72 fiber cable plus one 24 fiber cable.

30. The optical network of claim 18 wherein the router comprises an internet protocol router.

31. A method of providing a signal to a destination comprising:
receiving a redundant optical signal in each of two optical trunking modules;
transmitting the received redundant optical signal to each of two optical switch fabric modules;
optically switching and aggregating the received redundant optical signal;
providing quality of service for the switched redundant optical signal;
transmitting the switched redundant optical signal to one of several subscriber service ports contained on subscriber service modules; and
transmitting the switched redundant optical signal from the one of the several subscriber service ports to a subscriber fiber access box of a destination.

32. The method of claim 31 further comprising receiving the redundant optical signal from a network and routing the redundant optical signal to the two optical trunking modules.

33. The method of claim 31 further comprising converting the redundant optical signal from an optical signal to an electrical signal in the subscriber fiber access box.

34. The method of claim 31 wherein transmitting the switched redundant optical signal from the one of the several subscriber service ports to the subscriber fiber access box comprises transmitting the switched redundant optical signal to the subscriber fiber access box through an optical splice cabinet and a fiber breakout point housed in a pedestal.

35. The method of claim 34 wherein transmitting the switched redundant optical signal through the pedestal to the subscriber fiber access box comprises transmitting the switched redundant optical signal through the pedestal to one of a plurality of subscriber fiber access boxes.

36. The method of claim 34 wherein transmitting the switched redundant optical signal through the pedestal to the subscriber fiber access box comprises transmitting the switched redundant optical signal through one or more pedestals to one or more subscriber fiber access boxes.

* * * * *